United States Patent
Lee et al.

(10) Patent No.: US 8,239,300 B2
(45) Date of Patent: Aug. 7, 2012

(54) METHOD AND SYSTEM FOR EXTRACTING WEIGHT CLASSIFIED BY RANKING

(75) Inventors: Sang Keun Lee, Gyeonggi-do (KR); Min Uk Kim, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 850 days.

(21) Appl. No.: 11/869,608

(22) Filed: Oct. 9, 2007

(65) Prior Publication Data
US 2008/0086362 A1  Apr. 10, 2008

(30) Foreign Application Priority Data
Oct. 10, 2006  (KR) .................. 10-2006-0098454

(51) Int. Cl.
*G06Q 40/00*  (2006.01)
(52) U.S. Cl. ............................ 705/35; 705/14
(58) Field of Classification Search .............. 705/14, 705/35, 14.4
See application file for complete search history.

(56) References Cited

U.S. PATENT DOCUMENTS

| 7,813,959 B2 * | 10/2010 | Sobotka et al. ............. 705/14.54 |
| 2008/0010144 A1 * | 1/2008 | Chatwin et al. ................. 705/14 |

FOREIGN PATENT DOCUMENTS

| KR | 10-2006-0012066 | 2/2004 |
| WO | WO 2004-021110 | 3/2004 |

* cited by examiner

*Primary Examiner* — Thu Thao Havan
(74) *Attorney, Agent, or Firm* — H. C. Park & Associates, PLC (57) ABSTRACT

A method and system for extracting a weight classified by a ranking which can calculate, in a keyword advertisement, a unit sale cost of an advertisement area exposing advertisement information by considering an advertising effect classified by a keyword, the advertising effect being acquired by using the corresponding advertisement area, is provided. The method of extracting a weight classified by a ranking includes the steps of: generating the advertisement area, wherein one keyword corresponds to a plurality of advertisement areas and each of the plurality of advertisement areas corresponds to the ranking; and extracting a weight value for advertising costs of the advertisement area by considering an advertising effect classified by the ranking of the advertisement area corresponding to a click-through rate (CTR), and the ranking.

19 Claims, 8 Drawing Sheets

KEYWORD  DONGDAEMUN

| ADVERTISEMENT AREA | CTR (DURING LAST ONE WEEK) | PRICE WEIGHT (RATIO OF CTR OF CORRESPONDING ADVERTISEMENT AREA TO CTR OF ADVERTISEMENT AREA V) |
|---|---|---|
| ADVERTISEMENT AREA I | 78.2% | 7.82 |
| ADVERTISEMENT AREA II | 21.1% | 2.11 |
| ADVERTISEMENT AREA III | 15% | 1.5 |
| ADVERTISEMENT AREA IV | 14.6% | 1.46 |
| ADVERTISEMENT AREA V | 10% | 1 |

METHOD AND SYSTEM FOR EXTRACTING WEIGHT CLASSIFIED BY RANKING

CROSS-REFERENCE TO RELATED APPLICATION

This application claims the benefit of Korean Patent Application No. 10-2006-0098454, filed on Oct. 10, 2006, in the Korean Intellectual Property Office, the disclosure of which is incorporated herein by reference.

BACKGROUND OF THE INVENTION

1. Field of the Invention

The present invention relates to a method and system for extracting a weight classified by a ranking which can calculate, in a keyword advertisement, a unit sale cost of an advertisement area exposing advertisement information by considering an advertising effect classified by a keyword, the advertising effect being acquired by using the corresponding advertisement area.

2. Description of Related Art

As the Internet rapidly develops, a keyword search service searching for information via a communication network and a keyword advertisement providing service providing a searcher with advertisement information as a result of searching for a keyword is becoming common. The general keyword advertisement providing service selects a method of exposing, to the searcher, the advertisement information being a marketing public relations (PR) material of an advertiser corresponding to the keyword for searching when the searcher enters the keyword for searching in an accessed search site.

In the keyword advertisement providing service, a great difference between exposure frequencies of the advertisement information to the searcher, numbers of inquiries of a commercial site of the advertiser, and the like, may be shown depending on which location of a screen the advertisement information of the advertiser is exposed, and an advertising effect acquired by the advertiser is significantly affected.

Considering the above-described present situation, an operator of the search site providing the keyword advertisement providing service creates an advertising income by establishing a paid advertisement area, and exposing the advertisement information of the advertiser paying a predetermined unit sale cost for a location of the screen designated by the advertisement area.

However, since the conventional unit sale cost classified by the advertisement area is charged according to a general sale custom regardless of the advertising effect acquired from the corresponding advertisement area, the unit sale cost is unrealistic.

Also, even though a great difference between the advertising effects acquired according to exposure locations of the screen designated by the advertisement area is generated in the case of a specific keyword, a difference between the unit sale costs of the advertisement areas is generally fixed with respect to all keywords in a conventional unit sale cost-charging method. Accordingly, the conventional unit sale cost-charging method has a problem that the operator loses an opportunity of increasing the advertising income.

Accordingly, a unit sale cost-charging model of a new type which can overcome a problem that the conventional unit sale cost classified by the advertisement area is unrealistic by reflecting the advertising effect classified by the keyword acquired in the corresponding advertisement area on the difference between the unit sale costs of the advertisement areas is urgently required for the keyword advertisement.

BRIEF SUMMARY

The present invention provides a method and system for extracting a weight classified by a ranking which can provide an advertiser with a keyword advertisement providing service with a reasonable pricing system by calculating a unit sale cost of each advertisement area reflecting an advertising effect classified by a keyword, the advertising effect being acquired from the advertisement area.

The present invention also provides a method and system for extracting a weight classified by a ranking which can charge advertising costs proportional to an advertising effect by determining a difference between unit sale costs of advertisement areas in accordance with a degree of change of the advertising effect classified by the ranking of the advertisement areas corresponding to a click-through rate (CTR).

The present invention also provides a method and system for extracting a weight classified by a ranking which can prevent confusion when an advertiser intending to receive a keyword advertisement providing service selects an advertisement area by modifying a unit sale cost calculated in the advertisement area of the high ranking when the unit sale cost calculated in the advertisement area of the low ranking is higher than the unit sale cost calculated in the advertisement area of the high ranking.

According to an aspect of the present invention, there is provided a method of extracting a weight classified by a ranking of an advertisement area, the method including the steps of: generating the advertisement area, wherein one keyword corresponds to a plurality of advertisement areas and each of the plurality of advertisement areas corresponds to the ranking; and extracting a weight value for advertising costs of the advertisement area by considering an advertising effect classified by the ranking of the advertisement area corresponding to a CTR, and the ranking.

According to another aspect of the present invention, there is provided a method of extracting a weight classified by a ranking of an advertisement area, the method including the steps of: generating a plurality of advertisement areas respectively corresponding to the ranking; extracting a weight value for advertising costs of a second advertisement area corresponding to a high ranking by considering a weight value for advertising costs of a first advertisement area corresponding to a low ranking; and controlling the extracted weight value for advertising costs of the second advertisement area by reflecting a ratio of a CTR of the second advertisement area to a CTR of the first advertisement area.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop", "PC", "local computer", and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

A weight value for advertising costs classified by a ranking used throughout the present specification may denote information to enable a unit sale cost to be variously calculated for each advertisement area when the unit sale cost of the advertisement area related to exposure of advertisement information is calculated in a keyword advertisement. Specifically, the weight value for advertising costs classified by the ranking of the present invention may denote a multiplication value of each advertisement area multiplied by the unit sale cost of the advertisement area corresponding to the lowest ranking when the unit sale cost of the predetermined advertisement area is calculated.

In particular, the present invention may calculate the weight value for advertising costs classified by the ranking by considering a ratio of an advertising effect classified by the ranking of the existing advertisement area corresponding to a click-through rate (CTR) to a CTR of the object advertisement area, thereby charging an advertiser intending to receive a keyword advertisement providing service a reasonable advertising fee proportional to the advertising effect. The CTR is most commonly defined as number of clicks divided by number of impressions and generally not in terms of number of persons who clicked. It will be apparent to one of ordinary skill in the art of the search engine how to determine or modify the CTR.

The advertisement information exposed on a location of a screen designated by the advertisement area may denote one result item retrieved by a search engine in response to a search request, and be marketing public relations (PR) material of the advertiser or an item traded by the advertiser. For example, one piece of advertisement information may include a content title, a content summary, a link address, and the like, as brief information of a commercial site operated by the advertiser.

Figure 1:
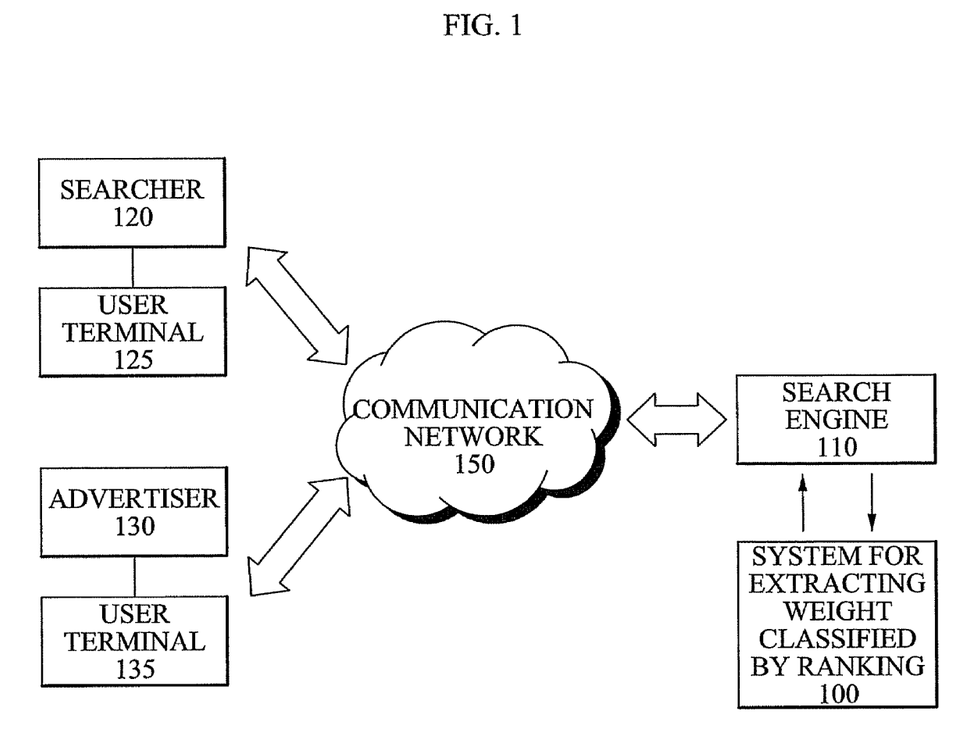
FIG. 1 illustrates an overview of a configuration of a system for extracting a weight classified by a ranking according to an exemplary embodiment of the present invention.

FIG. 1 illustrates an overview of a configuration of a system 100 for extracting a weight classified by a ranking according to an exemplary embodiment of the present invention.

The system 100 for extracting the weight classified by the ranking extracts a weight value for advertising costs of an advertisement area participating in exposure of advertisement information in a keyword advertisement. The system 100 for extracting the weight classified by the ranking extracts the weight value for advertising costs of the specific advertisement area by considering a degree of change of an advertising effect classified by the ranking of the advertisement areas corresponding to a CTR.

First, a search engine 110 may denote a search program or a search web server providing a searcher 120 who enters a keyword for searching in order to request a search, with content material related to the keyword, and advertisement information of an advertiser 130 according to a contract. Also, when the content material provided for the searcher 120 or the advertisement information is actually clicked by the searcher 120, the search engine 110 enables the searcher 120 to access a web site of a content provider (CP) or a commercial site of the advertiser 130, thereby providing the searcher 120 with detailed information of the content material, or enabling advertisement marketing of the advertiser 130.

When the advertisement information is provided, the advertiser 130 may designate, to the searcher 120a user terminal 125 used by the searcher 120, an environment of the interface where the advertisement information of the advertiser 130 is exposed to a screen, specifically, an entered keyword at a point in time of exposing the advertisement information, a location of the advertisement for placement in an advertisement area, and the like. When a contract related to the above-described designation of user environments is entered with the advertiser 130 and a keyword, which is the subject matter of the contract, is searched, the search engine 110 may expose the advertisement information of the advertiser 130 on the screen according to the exposure location agreed in the contract.

In the present invention, a plurality of advertisement areas may be designated according to advertisement categories, and each of the designated advertisement areas can expose a plurality of advertisement information in an order of a sequential ranking which corresponds to the displayed location on the screen. A plurality of advertisement categories may be categorized according to at least some of a plurality of factors, including, but not limited to, an exposed form of the advertisement information, an easy accessibility of many searchers, the click rate of the advertisement information, an advertising cost calculation method for charging the advertiser 130, and the like.

An example of the advertisement categories including 'Sponsorlink', 'Powerlink', 'Pluspro', 'Bizsite', and the like, is provided by NAVER® search web site at www.naver.com, and the advertisement category of "Powerlink" includes five advertisement areas corresponding to sequential rankings from the uppermost advertisement area may be included in the advertisement category 'Powerlink' from among the above-described advertisement categories.

The advertisement information may include commercial PR material such as the advertiser 130 or an item traded by the advertiser 130, a purchase event, and the like, and link information for accessing the commercial site operated by the advertiser 130. Accordingly, when the searcher 120 selectively clicks the advertisement information exposed to the location of the screen designated by the advertisement area, the search engine 110 enables the searcher 120 selectively clicking to access the commercial site of the advertiser 130 and induces the user to click to access the commercial site of the advertiser 130 by using the link information.

The searcher 120 may denote an Internet user having the user terminal 125 for accessing the system 100 for extracting the weight classified by the ranking of the present invention or the search engine 110, and generating a search request for the advertisement information, the content material, and the CP having the content material being searched for by entering a predetermined keyword in the search engine 110, and the like.

The advertiser 130 may be a beneficiary of a keyword advertisement providing service having another user terminal 135 for accessing the system 100 for extracting the weight classified by the ranking of the present invention or the search engine 110, and enabling advertisement marketing to be performed by exposing the advertisement information of the advertiser 130 to the searcher 120 entering the specific keyword.

The user terminals 125 and 135 maintain access states to the search engine 110 or the system 100 for extracting the weight classified by the ranking via a communication network 150 including the Internet and the like, expose the advertisement information to the searcher 120, and provide the advertiser 130 with various information related to the keyword advertisement providing service by visualizing the information.

The system 100 for extracting the weight classified by the ranking enables reasonable advertising fees to be charged to the advertiser according to the advertising effect in the keyword advertisement by extracting the weight value for advertising costs related to calculating the unit sale cost in the advertisement area considering a degree of change of the CTR of advertisement areas.

Hereinafter, referring to FIG. 2, a detailed configuration of a system 200 for extracting a weight classified by a ranking according to the present invention is described.

Figure 2:
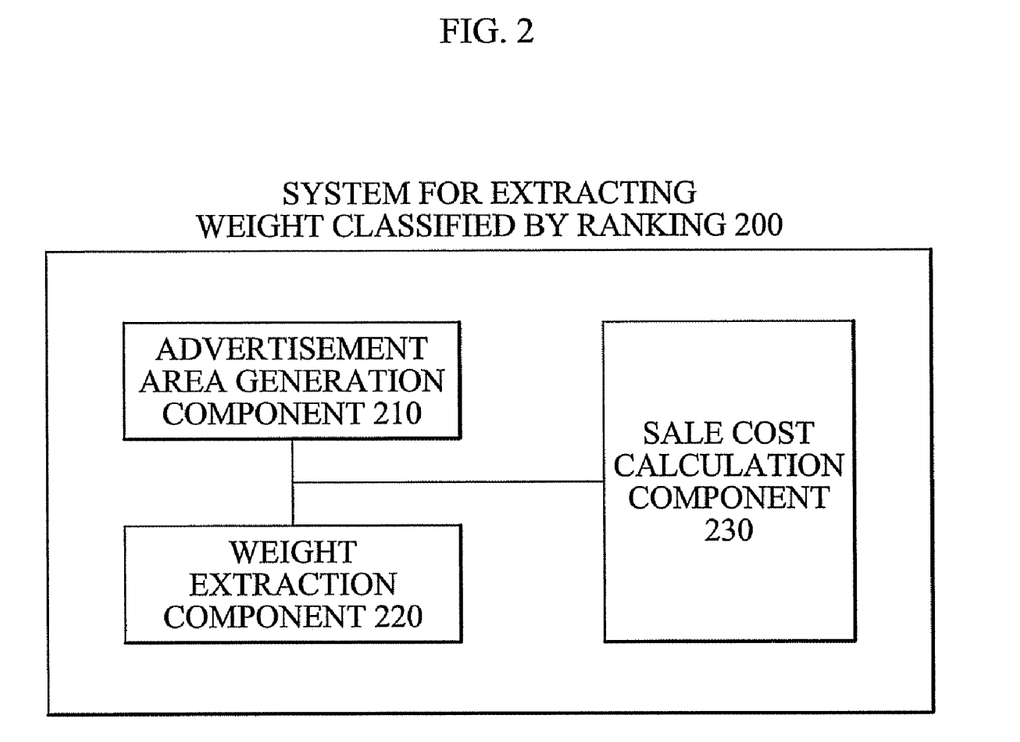
FIG. 2 is a configuration diagram illustrating a system for extracting a weight classified by a ranking in a keyword advertisement according to an exemplary embodiment of the present invention.

FIG. 2 is a configuration diagram illustrating a system 200 for extracting a weight classified by a ranking in a keyword advertisement according to an exemplary embodiment of the present invention.

The system 200 for extracting the weight classified by the ranking of the present invention may include an advertisement area generation component 210, a weight extraction component 220, and a sale cost calculation component 230.

The advertisement area generation component 210 generates a plurality of advertisement areas, wherein one keyword corresponds to the plurality of advertisement areas and each of the plurality of advertisement areas has a different ranking corresponding to the order of the advertisement placements in the respective advertisement category. Specifically, the advertisement area generation component 210 is associated with a number of advertisement areas established for each advertisement category, and enables each advertisement area included in the specific advertisement category to have a sequential ranking based upon the order of the placement.

For example, the advertisement area generation component 210 may generate five advertisement areas with respect to the advertisement category 'Powerlink' and include the five advertisement areas in the advertisement category 'Powerlink'. Also, where the advertisement category 'Powerlink' is disposed corresponding to its own rankings, the advertisement area generation component 210 can make a first location within the 'Powerlink' to display the advertisement area of the lowest ranking and a second location within the 'Powerlink' to display the advertisement area of the highest ranking.

The weight extraction component 220 extracts a weight value for advertising cost of the advertisement area by considering an advertising effect classified by the ranking of the generated advertisement area during a unit time corresponding to a CTR, and the ranking corresponding to the advertisement area. Here, the unit time may be a time established by an operator of the present system considering a system environment, and the operator may establish, for example, seven days of the previous one week as the unit time.

Specifically, the weight extraction component 220 calculates a first CTR of an advertisement area corresponding to a low ranking (hereinafter referred to as 'a first advertisement area'), and a second CTR of an advertisement area corresponding to a ranking higher than a ranking of the first advertisement area (hereinafter referred to as 'a second advertisement area'), and calculates a ratio of the calculated second CTR to the calculated first CTR as the weight value for advertising costs of the second advertisement area.

Hereinafter, referring to FIGS. 3, 4A, and 4B, it is described in detail that a weight value for advertising costs is extracted by the system 200 for extracting the weight classified by the ranking of the present invention.

Figure 3:
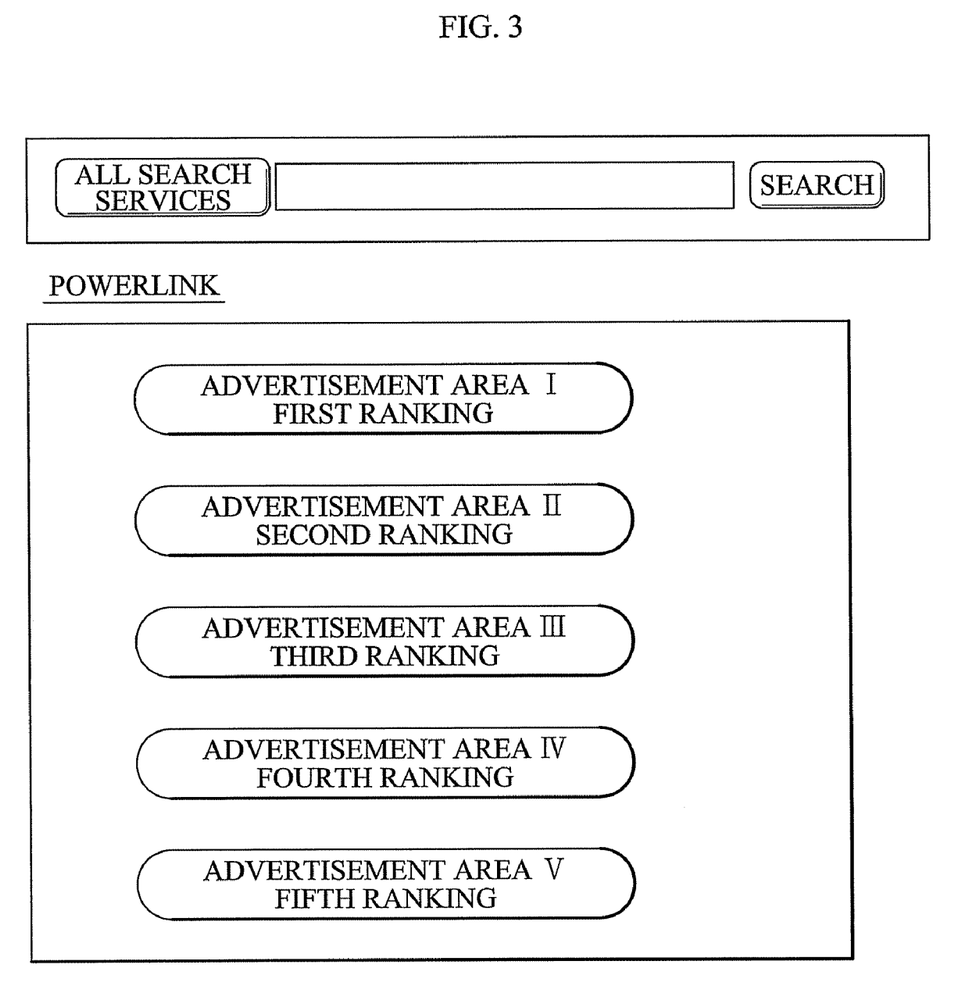
FIG. 3 illustrates an example of generating an advertisement area participating in exposure of advertisement information according to an exemplary embodiment of the present invention.

FIG. 3 illustrates an example of generating an advertisement area participating in exposure of advertisement information according to an exemplary embodiment of the present invention.

The advertisement information retrieved in response to a search request is exposed to a searcher in a specific location of a screen designated by the advertisement area. A respective advertisement area as described above may be generated by the advertisement area generation component 210 of the present invention for each established advertisement category. Also, the advertisement area generation component 210 enables each advertisement area to correspond to the ranking corresponding to the location of the screen where the advertisement information is exposed.

As illustrated in FIG. 3, the advertisement area generation component 210 generates a maximum of five advertisement areas for the advertisement category 'Powerlink', enables the advertisement areas to be included in the advertisement category 'Powerlink', and enables each generated advertisement area to correspond to the ranking ranging from the first ranking to the fifth ranking corresponding to the exposure location of the advertisement information. FIG. 3 illustrates that an 'advertisement area V' exposing, by the advertisement area generation component 210, the advertisement information on the lowest location of the screen where the advertisement category 'Powerlink' is disposed corresponds to the lowest ranking, a 'fifth ranking', and an 'advertisement area I' exposing the advertisement information on the highest location of the screen corresponds to the highest ranking, a 'first ranking'.

Figure 4A:
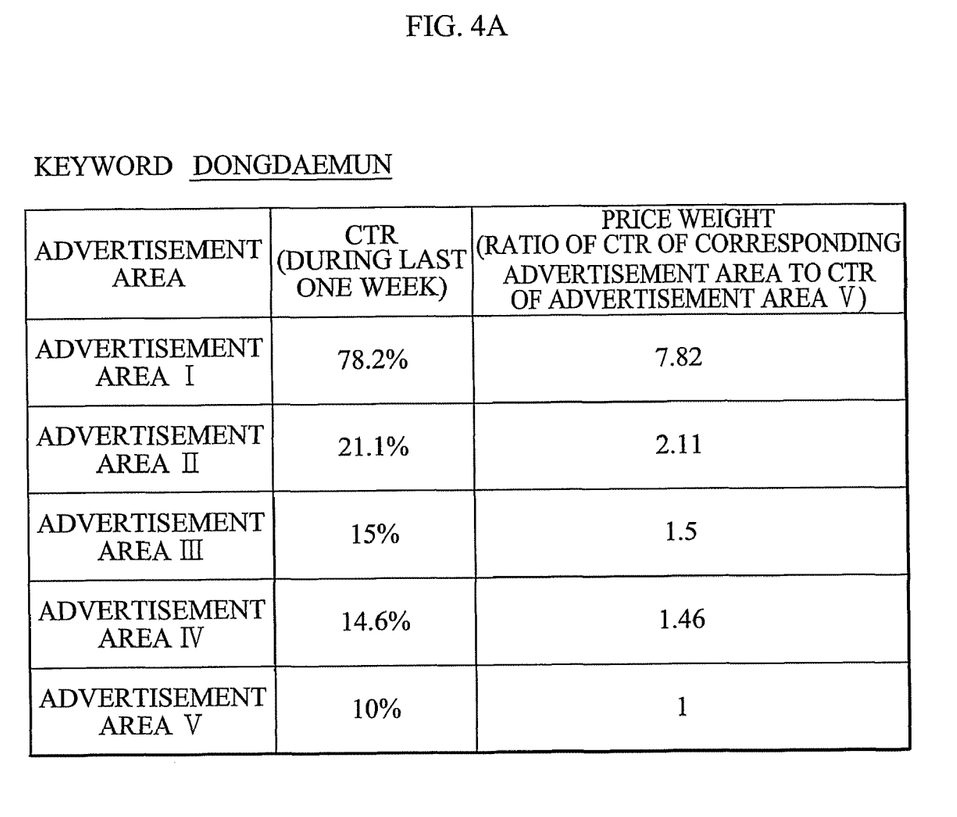
FIGS. 4A and 4B illustrate an example of extracting a weight value for advertising costs of each advertisement area according to an exemplary embodiment of the present invention.
Figure 4B:
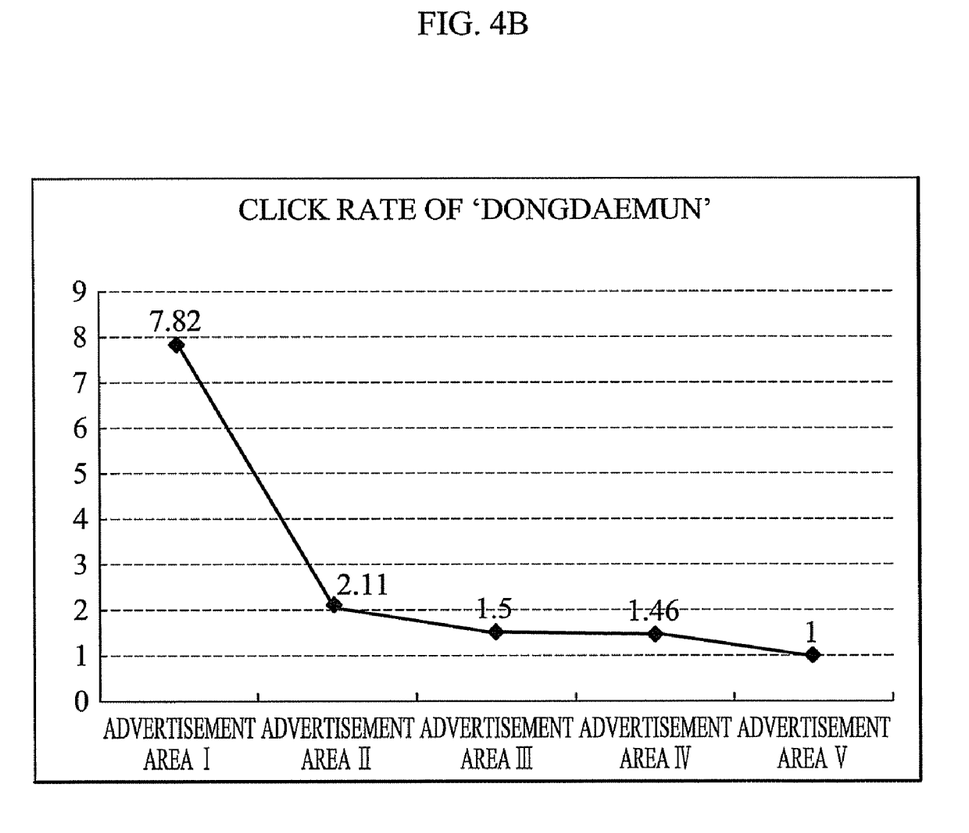

FIGS. 4A and 4B illustrate an example of extracting a weight value for advertising costs of each advertisement area according to an exemplary embodiment of the present invention. The weight extraction component 220 may extract a weight value for advertising costs of a plurality of advertisement areas included in an advertisement category by considering an advertising effect classified by the ranking of the advertisement area during a unit time corresponding to a CTR, and the corresponding ranking. When the weight value for advertising costs is extracted, the weight extraction component 220 extracts a ratio of the second CTR of the second advertisement area to the first CTR of the first advertisement area as the weight value for advertising costs of the second advertisement area.

FIG. 4A illustrates CTRs of advertisement areas, corresponding to the number of clicks divided by number of impressions, when a keyword 'Dondaemun' is entered. The weight extraction component 220 may extract a ratio of the CTR of each advertisement area I through IV corresponding to a ranking higher than the lowest ranking to the CTR of the advertisement area V corresponding to the lowest ranking as the weight value for advertising costs.

For example, when the CTR of the previous one week of the advertisement area V corresponding to the 'fifth ranking' being the lowest ranking is 10%, the weight extraction component 220 may extract the CTR, during an equal period, of the advertisement area IV corresponding to a 'fourth ranking' being a ranking higher than the 'fifth ranking' by one ranking, as '14.6%', and calculate a ratio of the two CTRs to be 1.46 (14.6%/10%) as the weight value for advertising costs of the advertisement area IV.

Also, the weight extraction component 220 may extract the CTR of the previous one week of the advertisement area III corresponding to a 'third ranking' as '15%', and calculate a ratio of the two CTRs to be 1.50 (15.0%/10%), as the weight value for advertising costs of the advertisement area III.

FIG. 4B is a graph illustrating a degree of change of a CTR classified by an advertisement area related to a keyword 'Dongdaemun' with respect to advertisement areas I through IV included in the advertisement category 'Powerlink'. It is understood that the degree of change of the CTR of the advertisement areas is '7.82:2.11:1.5:1.46:1' with respect to the advertisement areas I through V by establishing the advertisement area V as a reset standard in FIG. 4B.

Specifically, it is understood that the advertising effect acquired when the advertiser 130 exposes the advertisement information of the advertiser 130 on the advertisement area I is 7.82 times greater than the advertising effect when the advertiser 130 exposes the advertisement information on the advertisement area V in the keyword advertisement exposing the advertisement information to the searcher 120 when the keyword 'Dongdaemun' is entered. Similarly, the advertising effect acquired when the advertiser 130 exposes the advertisement information of the advertiser 130 on the advertisement area IV may be 2.11 times greater than the advertising effect acquired when the advertiser 130 exposes the advertisement information on the advertisement area V.

Accordingly, the weight extraction component 220 may calculate the weight value for advertising costs of the advertisement areas I through V as '7.82:2.11:1.5:1.46:1' by considering the advertising effect acquired in each advertisement area. Specifically, the weight extraction component 220 may extract the degree of change of the CTR of the advertisement areas as the weight value for advertising costs.

As another example of the present invention, a case is described where the weight value for advertising costs of the second advertisement area corresponding to the high ranking is extracted and is lower than the weight value for advertising costs of the first advertisement area corresponding to the low ranking.

As described above, the weight value for advertising costs is an element reflected when the unit sale cost of each advertisement area is calculated, and as a value of the extracted weight value for advertising costs increases, the unit sale cost calculated by a sale cost calculation component described below may also increase. Also, the ranking corresponding to the advertisement area may be assigned to each advertisement area corresponding to the CTR acquired when the advertisement information is exposed to the corresponding advertisement area.

However, the second CTR of the second advertisement area may be lower than the first CTR of the first advertisement area as required, and the weight value for advertising costs extracted for the second advertisement area may decrease concurrently. Also, when the future unit sale cost is calculated, the sale cost calculation component is required to calculate the unit sale cost of the first advertisement area to be higher than the unit sale cost of the second advertisement area, and this is an inverse phenomenon of a price. In this case, the system 200 for extracting the weight classified by the ranking causes a problem such as, for example, high advertising costs are charged to the advertiser 130 intending to receive the keyword advertisement providing service at a low cost by using the advertisement area of the low ranking.

In order to prevent the above-described problem, the weight extraction component 220 may perform a process to increase the weight value for advertising costs extracted for the second advertisement area by a predetermined amount when the weight value for advertising costs extracted for the second advertisement area is lower than the weight value for advertising costs extracted for the first advertisement area.

Figure 5:
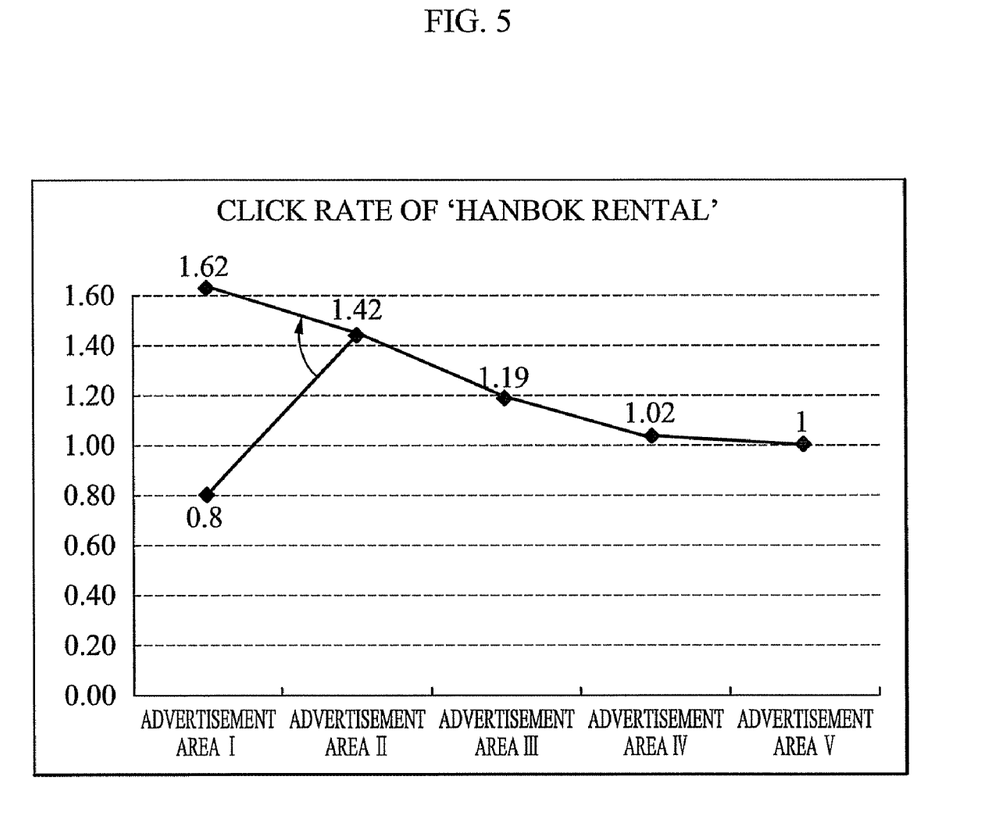
FIG. 5 illustrates an example of forcing an extracted weight value for advertising costs to be a predetermined amount when the extracted weight value for advertising costs is lower than a weight value for advertising costs of an advertisement area of a low ranking according to an exemplary embodiment of the present invention.

FIG. 5 illustrates an example of adjusting an extracted weight value for advertising costs to be a predetermined amount when the extracted weight value for advertising costs is lower than a weight value for advertising costs of an advertisement area of a low ranking according to an exemplary embodiment of the present invention.

FIG. 5 is a graph illustrating a degree of change of a CTR classified by an advertisement area related to a keyword 'hanbok (traditional Korean costume) rental' with respect to advertisement areas I through V included in the advertisement category 'Powerlink'.

FIG. 5 illustrates that the weight extraction component 220 adjusting the weight value for advertising costs of the advertisement area to be a predetermined amount when the extracted weight value for advertising costs of 0.8 of the advertisement area I corresponding to the 'first ranking' being the highest ranking is lower than the extracted weight value for advertising costs of 1.42 of the advertisement area II corresponding to 'the second ranking' being lower than the 'first ranking' by one ranking. Specifically, the weight extraction component 220 may force the extracted weight value for advertising costs of the advertisement area I to be higher than the extracted weight value for advertising costs of 1.42 of the advertisement area II, by a predetermined amount. FIG. 5 illustrates that the extracted weight value for advertising costs, 0.8, of the advertisement area I is adjusted by the weight extraction component 220 to be 1.62 which is higher than the extracted weight value for advertising costs of the advertisement area II of 1.42.

Referring to FIG. 2 again, the sale cost calculation component 230 determines a unit sale cost of the first advertisement area corresponding to the low ranking, and calculates a unit sale cost of the second advertisement area by applying the extracted weight value for advertising costs of the second advertisement area corresponding to the ranking higher than the ranking of the first advertisement area to the determined unit sale cost of the first advertisement area. Specifically, when the unit sale cost is calculated, the sale cost calculation component 230 may first determine the unit sale cost of the advertisement area being a reset standard, and calculate the unit sale cost of the second advertisement area by multiplying the extracted weight value for advertising costs of the second advertisement area by the determined unit sale cost.

The advertisement area being the reset standard of calculating the unit sale cost in the present exemplary embodiment of the present invention may be the advertisement area corresponding to the lowest ranking. Accordingly, the sale cost calculation component 230 first determines the unit sale cost of the advertisement area corresponding to the lowest ranking.

Specifically, the sale cost calculation component 230 may set the first advertisement area being the reset standard of calculating the unit sale cost as the advertisement area corresponding to the lowest ranking, and (1) calculate information of a number of exposures related to exposure of advertisement information associated with the keyword by using the first advertisement area during a predetermined period.

For example, the sale cost calculation component 230 may calculate, as the information of the number of exposures, a number of exposures of advertisement information associated with the keyword 'Dongdaemum' by using the first advertisement area in response to the keyword 'Dongdaemum' which the searcher 120 enters for a search request during a predetermined period.

Also, the sale cost calculation component 230 (2) calculates a purchasing power index of the keyword based on sale information during the predetermined period. The sale information includes a difference between a number of salable advertisement areas generated for the keyword, and a number of sold advertisement areas. Specifically, the sale cost calculation component 230 calculates the purchasing power index of the specific keyword by considering the difference between the number of advertisement areas which are unpurchased by the advertiser 130 and do not match the advertisement information to be exposed, and the number of advertisement areas which are purchased by the advertiser 130 and match the advertisement information to be exposed.

For example, when all advertisement information from among advertisement areas included in the advertisement category 'Powerlink' for the keyword 'Dongdaemum' is still unpurchased, the number of salable advertisement areas may be '5', and the number of sold advertisement areas may be '0'. Accordingly, the sale cost calculation component 230 may calculate the purchasing power index corresponding to information of the difference between the number of salable advertisement areas and the number of sold advertisement areas included in the sale information, '5'. For example, when the purchasing power index is calculated, the sale cost calculation component 230 may search for and extract the purchasing power index corresponding to the information of the difference between the number of salable advertisement areas and the number of sold advertisement areas, '5', from a purchasing power index table previously made by an operator of the present system when the number of salable advertisement areas is '5', and the number of sold advertisement areas is '0'.

According to an exemplary embodiment of the present invention, the sale cost calculation component 230 may additionally increase the purchasing power index as the difference between the number of salable advertisement areas and the number of sold advertisement areas decreases when the purchasing power index is calculated. Specifically, the sale cost calculation component 230 may determine popularity or a purchasing power of the keyword as being high, as the difference between the number of salable advertisement areas and the number of sold advertisement areas decreases, and increase the purchasing power index of the keyword.

Also, according to another exemplary embodiment of the present invention, when the purchasing power index is calculated, the sale cost calculation component 230 may increase the purchasing power index as the number of salable advertisement areas increases when the difference between the number of salable advertisement areas and the number of sold advertisement areas is equal.

Also, the sale cost calculation component 230 (3) determines the unit sale cost of the first advertisement area by multiplying the calculated information of the number of exposures by the purchasing power index. Specifically, the sale cost calculation component 230 first determines the unit sale cost of the advertisement area corresponding to the lowest ranking proportional to the information of the number of exposures and the purchasing power index.

The sale cost calculation component 230, which determines the unit sale cost of the advertisement area corresponding to the lowest ranking by using the above-described sequential process, may calculate the unit sale cost of the specific advertisement area by multiplying the extracted weight value for advertising costs of each advertisement area by the determined unit sale cost of the advertisement area corresponding to the lowest ranking.

For example, when the weight value for advertising costs extracted for each advertisement area I through V generated for the keyword 'Dongdaemum' is '7.82:2.11:1.5:1.46:1', and the determined sale cost of the advertisement area V corresponding to the 'fifth ranking' being the lowest ranking is '273,000 won', the sale cost calculation component 230 may calculate the unit sale cost of each advertisement area by multiplying the weight value for advertising costs by the determined '273,000 won'. Specifically, the sale cost calculation component 230 may calculate the unit sale cost of the advertisement area I as '2,134,860 won (7.82*273,000)', calculate the unit sale cost of the advertisement area II as '576,030 won (2.11*273,000)', calculate the unit sale cost of the advertisement area III as '409,500 won (1.5*273,000)', and calculate the unit sale cost of the advertisement area IV as '398,580 won (1.46*273,000)'.

Also, the sale cost calculation component 230 may force the unit sale cost of the second advertisement area to be increased by a predetermined amount when the unit sale cost of the first advertisement area is calculated and is higher than the unit sale cost of the second advertisement area. Specifically, the sale cost calculation component 230 forces the unit sale cost of the second advertisement area when the weight value for advertising costs of the second advertisement area is extracted and is lower than the weight value for advertising costs of the first advertisement area, and the unit sale cost of the second advertisement area having the ranking relatively higher than the ranking of the first advertisement area is calculated and is lower than the unit sale cost of the first advertisement area having the ranking lower than the ranking of the second advertisement area.

According to the present invention, it is possible to provide an advertiser with a keyword advertisement providing service with a reasonable pricing system by calculating a unit sale cost of each advertisement area reflecting an advertising effect classified by a keyword, the advertising effect being determined from the advertisement area.

Also, according to the present invention, it is possible to charge advertising costs proportional to an advertising effect by determining a difference between unit sale costs of advertisement areas in accordance with a degree of change of the advertising effect classified by the ranking of the advertisement areas corresponding to a CTR.

Also, according to the present invention, it is possible to prevent confusion when an advertiser intending to receive a keyword advertisement providing service selects an advertisement area by adjusting a unit sale cost calculated in the advertisement area of the high ranking when the unit sale cost calculated in the advertisement area of the low ranking is higher than the unit sale cost calculated in the advertisement area of the high ranking.

According to another exemplary embodiment of the present invention, the system 200 for extracting the weight classified by the ranking may first extract the weight value for advertising costs of each advertisement area based on a standard CTR ratio of advertisement areas, and optimally control the extracted weight value for advertising costs by considering the CTR of the advertisement area.

For this, the system 200 for extracting the weight classified by the ranking extracts a weight value for advertising costs of a second advertisement area corresponding to a high ranking by considering a weight value for advertising costs of a first advertisement area corresponding to a low ranking. Specifically, the system 200 for extracting the weight classified by the ranking automatically extracts, as '1.7', the weight value for advertising costs of the advertisement area corresponding to the first ranking by establishing a standard advertisement area, that is, the advertisement area corresponding to the fifth ranking as a reset standard for all keywords in the keyword advertisement, and extracts, as '1.5', the weight value for advertising costs of the advertisement area corresponding to the second ranking. Also, the system 200 for extracting the weight classified by the ranking automatically extracts, as '1.2', the weight value for advertising costs of the advertisement area corresponding to the third ranking, and extracts, as '1.1', the weight value for advertising costs of the advertisement area corresponding to the fourth ranking.

Also, the system 200 for extracting the weight classified by the ranking controls the extracted weight value for advertising costs of the second advertisement area by reflecting a ratio of a CTR of the second advertisement area to a CTR of the first advertisement area. When the CTR of the advertisement area corresponding to the first ranking is five times greater than the CTR of the advertisement area corresponding to the fifth ranking, the system 200 for extracting the weight classified by the ranking may modify the weight value for advertising costs extracted for the advertisement area corresponding to the first ranking, '1.7', to be '5' according to the ratio of CTRs of the advertisement areas.

Next, the system 200 for extracting the weight classified by the ranking may perform a sequential process such as calculating the unit sale cost of each advertisement area by using the controlled weight value for advertising costs, forcing the unit sale cost to be a predetermined amount when the unit sale cost is calculated to be contrary to the ranking, and the like. Since a detailed description thereof is given above, the detailed description is omitted here.

According to the present invention, it is possible to generate a reasonable advertising pricing system in the keyword advertisement by automatically extracting the weight value for advertising costs classified by the identical advertisement area for all keywords, and variously modifying the extracted weight value for advertising costs reflecting a CTR ratio of the advertisement areas.

Hereinafter, an operational flow of a method of extracting a weight classified by a ranking according to an exemplary embodiment of the present invention is described in detail.

Figure 6:
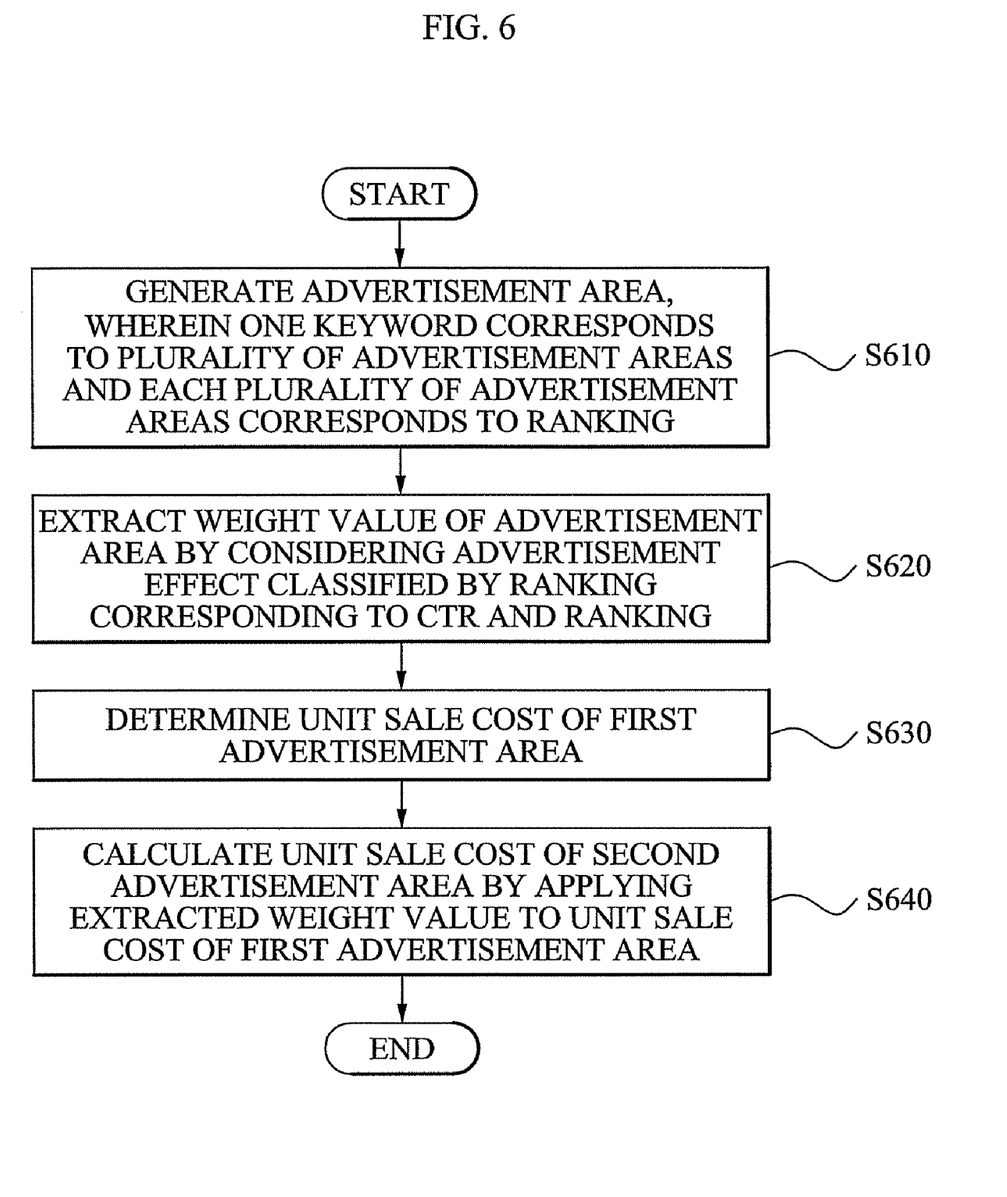
FIG. 6 is a flowchart illustrating in detail a method of extracting a weight classified by a ranking according to an exemplary embodiment of the present invention.

FIG. 6 is a flowchart illustrating in detail a method of extracting a weight classified by a ranking according to an exemplary embodiment of the present invention.

The method of extracting the weight classified by the ranking of the present invention may be performed by the above-described system 200 for extracting the weight classified by the ranking.

First, the system 200 for extracting the weight classified by the ranking generates the advertisement area, wherein one keyword corresponds to a plurality of advertisement areas and each of the plurality of advertisement areas corresponds to the ranking in operation S610. Operation S610 is a process of including a number of advertisement areas established for each advertisement category, and enabling each advertisement area included in the specific advertisement category to correspond to the sequential ranking. For example, the system 200 for extracting the weight classified by the ranking generates and includes five advertisement areas for the advertisement category 'Powerlink', and enables the advertisement area exposing advertisement information in the lowest location of a screen where the 'Powerlink' is displayed to correspond to the lowest ranking, and the advertisement area exposing the advertisement information in the highest location to correspond to the highest ranking.

Also, the system 200 for extracting the weight classified by the ranking extracts a weight value for advertising costs of the advertisement area by considering an advertising effect classified by the ranking of the advertisement area during a unit time corresponding to a CTR and the ranking, in operation S620. Operation S620 is a process of extracting a ratio of the CTR of the advertisement area corresponding to the ranking higher than the lowest ranking to the CTR of the advertisement area corresponding to the lowest ranking, as the weight value for advertising costs of the corresponding advertisement area.

Figure 7:
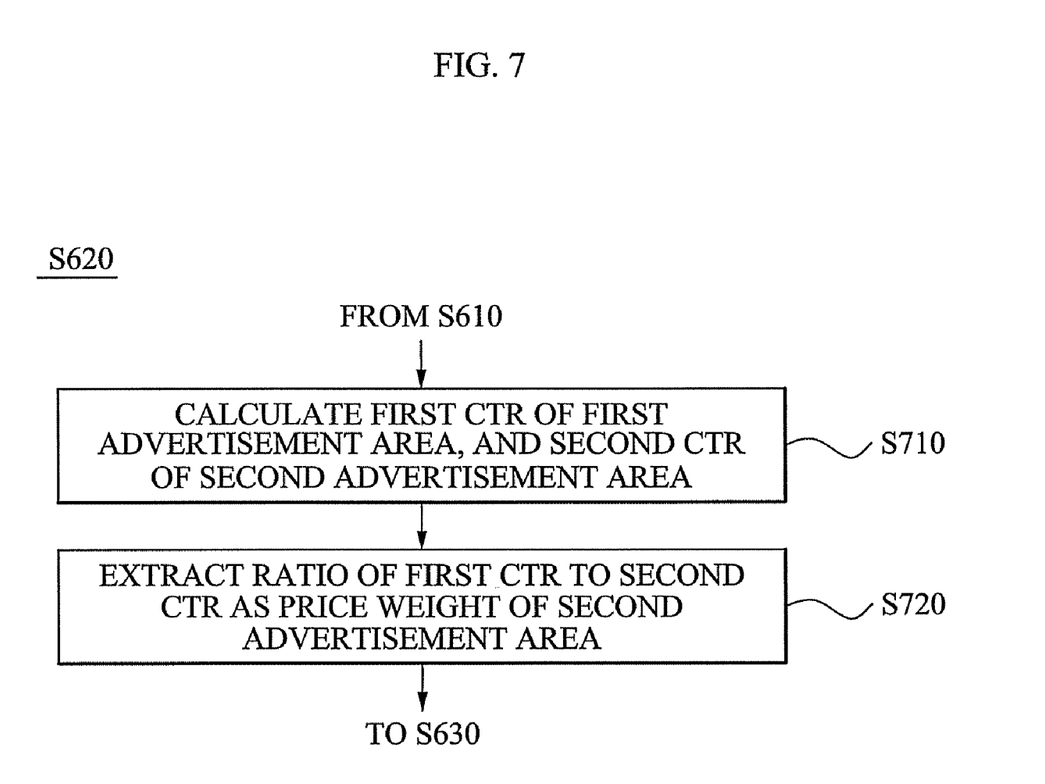
FIG. 7 is a flowchart illustrating an example of extracting a weight value for advertising costs of an advertisement area according to an exemplary embodiment of the present invention.

FIG. 7 is a flowchart illustrating an example of extracting a weight value for advertising costs of an advertisement area according to an exemplary embodiment of the present invention.

First, the system 200 for extracting the weight classified by the ranking calculates a first CTR of a first advertisement area corresponding to a predetermined ranking, and a second CTR of a second advertisement area corresponding to a ranking higher than a ranking of the first advertisement area in operation S710. Operation S710 is a process of calculating a ratio of a number of exposures of advertisement information by using each advertisement area to a number of actual clicks of the searcher 120 after exposing the advertisement information, that is, the CTR, for each advertisement area when a keyword is entered by the searcher 120 for a search request.

Also, the system 200 for extracting the weight classified by the ranking extracts a ratio of the calculated second CTR to the calculated first CTR as the weight value for advertising costs of the second advertisement area in operation S720. Operation S720 is a process of extracting the weight value for advertising costs of the corresponding advertisement area by using the ratio of the CTR of the advertisement area corresponding to the ranking higher than the low ranking to the CTR of the advertisement area corresponding to the low ranking.

Referring to FIG. 6 again, the system 200 for extracting the weight classified by the ranking determines a unit sale cost of the first advertisement area in operation S630. Operation S630 is a process of determining the unit sale cost of the advertisement area corresponding to the lowest ranking being a reset standard when the unit sale cost of each advertisement area is calculated.

The system 200 for extracting the weight classified by the ranking calculates information of a number of exposures related to exposure of advertisement information associated with the keyword by using the first advertisement area during a predetermined period in order to determine the unit sale cost of the advertisement area corresponding to the lowest ranking in operation S630.

Also, the system 200 for extracting the weight classified by the ranking calculates a purchasing power index of the keyword based on sale information during the predetermined period. Specifically, the system 200 for extracting the weight classified by the ranking calculates the purchasing power index of the specific keyword by considering the difference between the number of advertisement areas which are unpurchased by the advertiser 130 and do not match the advertisement information to be exposed, and the number of advertisement areas which are purchased by the advertiser 130 and match the advertisement information to be exposed.

In particular, the system 200 for extracting the weight classified by the ranking may additionally increase the purchasing power index as the difference between the number of salable advertisement areas and the number of sold advertisement areas decreases when the purchasing power index is calculated. Specifically, the system 200 for extracting the weight classified by the ranking may determine popularity or a purchasing power of the keyword to be the difference between the number of salable advertisement areas and the number of sold advertisement areas decreases, and increase the purchasing power index.

Also, when the purchasing power index is calculated, the system 200 for extracting the weight classified by the ranking may additionally increase the purchasing power index as the number of salable advertisement areas increases when the difference between the number of salable advertisement areas and the number of sold advertisement areas is equal.

Next, the system 200 for extracting the weight classified by the ranking determines the unit sale cost of the first advertisement area by multiplying the calculated information of the number of exposures by the purchasing power index. Specifically, the system 200 for extracting the weight classified by the ranking determines the unit sale cost of the advertisement area corresponding to the lowest ranking proportional to the information of the number of exposures and the purchasing power index.

Next, the system 200 for extracting the weight classified by the ranking calculates a unit sale cost of the second advertisement area by applying the extracted weight value for advertising costs to the determined unit sale cost of the first advertisement area in operation S640. Operation S640 is a process of calculating the unit sale cost of the specific advertisement area by multiplying the extracted weight value for advertising costs of each advertisement area by the determined unit sale cost of the advertisement area corresponding to the lowest ranking.

According to the present invention, it is possible to provide an advertiser with a keyword advertisement providing service with a reasonable pricing system by calculating a unit sale cost of each advertisement area reflecting an advertising effect classified by a keyword, the advertising effect being acquired from the advertisement area.

Also, according to the present invention, it is possible to charge advertising costs proportional to an advertising effect by determining a difference between unit sale costs of advertisement areas in accordance with a degree of change of the advertising effect classified by the ranking of the advertisement areas corresponding to a CTR.

According to another exemplary embodiment of the present invention, the system 200 for extracting the weight classified by the ranking may force the unit sale cost of the advertisement area corresponding to the high ranking to be increased by a predetermined amount when the unit sale cost of the advertisement area corresponding to the low ranking is calculated to be higher than the unit sale cost of the advertisement area corresponding to the high ranking. Specifically, when the weight value for advertising costs of the advertisement area corresponding to the high ranking is extracted and is lower than the weight value for advertising costs of the advertisement area corresponding to the low ranking, and the unit sale cost of the advertisement area corresponding to the high ranking is calculated to be lower than the unit sale cost of the advertisement area corresponding to the low ranking, the system 200 for extracting the weight classified by the ranking may force the unit sale cost of the advertisement area corresponding to the high ranking to be higher than the unit sale cost of the advertisement area corresponding to the next ranking by increasing the unit sale cost of the advertisement area corresponding to the high ranking or increasing the weight value for advertising costs of the advertisement area corresponding to the high ranking.

Also, according to the present invention, it is possible to prevent confusion when an advertiser intending to receive a keyword advertisement providing service selects an advertisement area by modifying a unit sale cost calculated in the advertisement area of the high ranking when the unit sale cost calculated in the advertisement area of the low ranking is higher than the unit sale cost calculated in the advertisement area of the high ranking.

According to another exemplary embodiment of the present invention, the system 200 for extracting the weight classified by the ranking may extract the weight value for advertising costs of each advertisement area based on a standard CTR ratio, and optimally modify the extracted weight value for advertising costs by considering the CTR of the advertisement area.

Specifically, the system 200 for extracting the weight classified by the ranking extracts a weight value for advertising costs of an advertisement area corresponding to a high ranking by considering a weight value for advertising costs of an advertisement area corresponding to a low ranking.

Also, the system 200 for extracting the weight classified by the ranking modifies the extracted weight value for advertising costs of the advertisement area corresponding to the high ranking by reflecting a ratio of a CTR of the advertisement area corresponding to the high ranking to a CTR of the advertisement area corresponding to the low ranking.

Next, the system 200 for extracting the weight classified by the ranking may calculate the unit sale cost of each advertisement area by using the modified weight value for advertising costs, and force the unit sale cost to be a predetermined amount when the unit sale cost is calculated contrary to the ranking.

According to the present invention, it is possible to generate a reasonable advertising pricing system in the keyword advertisement by extracting the weight value for advertising costs classified by the identical advertisement area for all keywords, and modifying the extracted weight value for advertising costs to reflect a CTR ratio of the advertisement areas.

The exemplary embodiments of the present invention include computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

According to the present invention, a method and system for extracting a weight classified by a ranking may provide an advertiser with a keyword advertisement providing service with a reasonable pricing system by calculating a unit sale cost of each advertisement area reflecting an advertising effect classified by a keyword, the advertising effect being acquired from the advertisement area.

Also, according to the present invention, a method and system for extracting a weight classified by a ranking may charge advertising costs proportional to an advertising effect by determining a difference between unit sale costs of advertisement areas in accordance with a degree of change of the advertising effect classified by the ranking of the advertisement areas corresponding to a CTR.

Also, according to the present invention, a method and system for extracting a weight classified by a ranking may prevent confusion when an advertiser intending to receive a keyword advertisement providing service selects an advertisement area by modifying a unit sale cost calculated in the advertisement area of the high ranking when the unit sale cost calculated in the advertisement area of the low ranking is higher than the unit sale cost calculated in the advertisement area of the high ranking.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for".

What is claimed is:

1. A computer-implemented method for providing advertising information, the method comprising:
   generating a plurality of advertisement areas for displaying keyword advertising on various locations of a searcher's screen, wherein each of the plurality of the advertisement areas is classified with a different ranking in accordance with the respective locations of the searcher's screen;

determining, by a processor of the computer, a weight value for calculating an advertising cost of each of the advertisement areas based upon a click-through rate (CTR) and a ratio of the CTR of the respective advertisement areas to the corresponding CTR of the lowest ranking advertisement area; and providing the advertising cost in relation with each of the advertisement areas according to the determination.

2. The method of claim 1, wherein determining the weight value further comprises:
calculating a first click-through rate (CTR) of a first advertisement area, and a second CTR of a second advertisement area, wherein the second advertisement area has a higher ranking than the first advertisement area;
calculating a ratio of the first CTR to the second CTR; and
determining the weight value of the second advertisement area according to the calculated ratio.

3. The method of claim 1, further comprising:
determining a first advertisement area from the plurality of advertisement areas;
extracting a weight value corresponding to the first advertisement area, wherein the weight value is determined by the CTR of the first advertisement area; and
calculating a unit sale cost corresponding to a second advertisement area by using the extracted weight value, wherein the second advertisement area has a higher ranking than the first advertisement area.

4. The method of claim 3, wherein the first advertisement area comprises the lowest ranking among the plurality of the advertisement areas, and wherein calculating the advertising costs further comprises:
calculating information of a number of advertising exposures associated with a keyword by using the first advertisement area during a period;
calculating a purchasing power index of the keyword based on sale information comprising number of salable advertisement areas and number of sold advertisement areas during the predetermined period; and
determining the unit sale cost of the first advertisement area by multiplying the calculated information of the number of advertising exposures by the purchasing power index.

5. The method of claim 4, wherein the sale information comprises a difference between a number of the salable advertisement areas generated corresponding to the keyword, and a number of the sold advertisement areas, and wherein calculating the purchasing power index comprises
increasing the purchasing power index upon detection of a decreasing difference between the number of salable advertisement areas and the number of sold advertisement areas; or
increasing the purchasing power index upon detection of an increasing number of salable advertisement areas, wherein the difference between the number of salable advertisement areas and the number of sold advertisement areas is equal.

6. The method of claim 3, wherein the second advertisement area has a ranking higher than the ranking of the first advertisement area by one ranking, and in response to detection of the unit sale cost of the second advertisement area being lower than the unit sale cost of the first advertisement area according to the calculation
adjusting the calculated unit sale cost of the second advertisement area to be higher than the unit sale cost of the first advertisement area by a predetermined value by changing the weight value of the second advertisement area.

7. A computer-implemented method for providing an advertising cost of an advertisement area, the method comprising:
generating a plurality of advertisement areas comprising a first advertisement area and a second advertisement area for displaying the keyword advertising on various locations of a searcher's screen, wherein each of the plurality of the advertisement areas is classified with a different ranking in accordance with the respective locations of the searcher's screen;
determining, by a processor of the computer, a weight value of the second advertisement area according to a ratio of a click-through rate (CTR) of the second advertisement area to the corresponding CTR of the first advertisement area; and
providing advertising costs associated with the determined weight value.

8. The method of claim 7, further comprising:
determining a unit sale cost of the first advertisement area; and
calculating a unit sale cost of the second advertisement area by applying the weight value of the second advertisement area to the determined unit sale cost of the first advertisement area.

9. The method of claim 7, wherein the second advertisement area has a ranking higher than the ranking of the first advertisement area by one ranking, and in response to determination of a unit sale cost of the second advertisement area being lower than a unit sale cost of the first advertisement area
adjusting the unit sale cost of the second advertisement area to be higher than the unit sale cost of the first advertisement area by a predetermined value by changing the weight value of the second advertisement area.

10. A non-transitory computer-readable storage medium comprising an executable program, which when executed, performs to provide an advertising cost associated with a ranking of an advertisement area, the method comprising:
generating a plurality of advertisement areas for displaying the keyword advertising on various locations of a searcher's screen, wherein each of the plurality of the advertisement areas is classified with a different ranking in accordance with the respective locations of the searcher's screen; and
determining weight values for calculating advertising costs of the each advertisement area based upon a click-through rate (CTR) and a ratio of the CTR of the respective advertisement areas to the corresponding CTR of the lowest ranking advertisement area.

11. A system for providing keyword advertising, the system comprising:
an advertisement area generation component configured to generate advertising areas for displaying keyword advertising associated with various locations of a searcher's screen, wherein each of the advertising areas is classified with a different ranking in accordance with the respective locations of a searcher's screen; and
a weight extraction component configured to determine weight values to calculate advertising costs with respect to each of the advertisement areas based upon a click-through rate (CTR) and a ratio of the CTR of the respective advertisement areas to the corresponding CTR of the lowest ranking advertisement area.

12. The system of claim 11, wherein the weight extraction component is configured to calculate a first click-through rate (CTR) of a first advertisement area, and a second CTR of a second advertisement area, a ranking of the second advertisement area being higher than a ranking of the first advertisement area, and to extract a ratio of the first CTR to the second CTR as the weight value of the second advertisement area.

13. The system of claim 11, further comprising:
a sale cost calculation component being configured to determine a unit sale cost of the first advertisement area, and to calculate a unit sale cost of the second advertisement area by applying the weight value of the second advertisement area to a unit sale cost of the first advertisement area.

14. The system of claim 13, wherein the sale cost calculation component is configured to
calculate a number of exposures related to advertising information exposed associated with the keyword corresponding to the first advertisement area during a period,
to calculate a purchasing power index of the keyword based on sale information during the period, and
to determine the unit sale cost of the first advertisement area by multiplying the number of exposures by the purchasing power index in response to determination of the first advertisement area being an advertisement area corresponding to the lowest ranking.

15. The system of claim 14, wherein the sale information comprises a difference between a number of salable advertisement areas generated corresponding to the keyword and a number of sold advertisement areas, and wherein the sale cost calculation component is configured to increase the purchasing power index upon detection of a decreasing difference between the number of salable advertisement areas and the number of sold advertisement areas, or to increase the purchasing power index upon detection of an increasing number of salable advertisement areas if the difference between the number of salable advertisement areas and the number of sold advertisement areas is detected as equal.

16. The system of claim 13, wherein the second advertisement area has a ranking higher than the ranking of the first advertisement area by one ranking, and
in response to detection of the unit sale cost of the second advertisement area being lower than the unit sale cost of the first advertisement area,
the sale cost calculation component is configured to control the calculated unit sale cost of the second advertisement area to be higher than the unit sale cost of the first advertisement area by a predetermined value by adjusting the extracted weight value of the second advertisement area.

17. An apparatus comprising:
a processor configured to generate a plurality of advertisement areas for providing keyword advertising on various locations of a searcher's screen, wherein each of the plurality of the advertisement areas is classified with a different ranking in accordance with the respective locations of the searcher's screen, wherein the processor is further configured to determine a weight value by calculating an advertising cost of each of the advertisement areas based upon a click-through rate (CTR) and a ratio of the CTR of the respective advertisement areas to the corresponding CTR of the lowest ranking advertisement area, and wherein an advertising cost with respect to each advertisement area is provided.

18. A server for providing an advertising cost, the server comprising:
a processor of the server configured to determine an advertising area comprising the lowest ranking from a plurality of advertising areas comprising different rankings, each advertising area defined for providing advertisement information associated with a search keyword, and to calculate a click-through rate (CTR) corresponding to the lowest ranking advertising area and respective CTRs corresponding to the differently ranked advertising areas, wherein a price weight corresponding to each advertising areas is extracted based on a ratio of the respective CTRs to the CTR of the lowest ranking advertising area, and wherein the advertising cost is provided according to the price weight.

19. An apparatus comprising:
a processor configured to receive a request of advertising cost for keyword advertising with a plurality advertising areas comprising a first advertising area and a second advertising area, the processor to calculate first click-through rate (CTR) of the first advertising area and second CTR of the second advertising area, wherein a ratio of the first CTR to the second CTR is extracted as a weight to calculate an advertising cost for the respective advertising areas.

* * * * *